Oct. 8, 1935. E. WALDSCHMIDT 2,016,699
METHOD OF PRODUCING ELECTRON BULBS WITH HIGH EMISSION CATHODES
Filed Nov. 11, 1932

Inventor:
Ernst Waldschmidt

Patented Oct. 8, 1935

2,016,699

UNITED STATES PATENT OFFICE 2,016,699

METHOD OF PRODUCING ELECTRON BULBS WITH HIGH EMISSION CATHODES

Ernst Waldschmidt, Berlin, Germany

Application November 11, 1932, Serial No. 642,191
In Germany November 16, 1931

8 Claims. (Cl. 250—27.5)

The present invention relates to thermionic cathodes, the emissive surface of which includes at least one alkaline earth metal and oxygen, and has for its object an improved method for producing thermionic cathodes of this type.

According to the invention, a cathode core consisting at least at its surface of a metal of the sixth group of the periodical system, such as tungsten, molybdenum or chromium, is at first superficially oxidized and the oxide coating thus produced is then made to react with a solution of a compound of an earth alkaline or like metal. Upon this reaction there is formed firstly a compound containing the body metal, an alkaline earth metal and oxygen and the composition of which is not exactly defined. This compound is thereupon either heated until pure body metal and alkaline earth oxide are formed, and then activated by vaporizing an activating metal onto the compound, or is converted in direct fashion by application of a suitable activating metal into pure body metal and oxide coating, which if necessary may be covered by an excess of the activating metal.

According to the invention, the oxidizing process may be separate from the reaction process, or may be performed simultaneously therewith in the same bath.

The applicant has found that the layer containing the body metal, alkaline earth metal and oxygen compound, which according to the invention is formed around the cathode core is not entirely dense and is porous to some extent. It has been found suitable to fill the pores of this layer with an alkaline earth salt by immersing the coated core in an alkaline earth metal salt solution. In this manner it is possible to obtain after heating, a completely dense layer of oxide on the cathode core.

The method of the invention will be described by way of example in conjunction with a tungsten-barium cathode:

A tungsten wire cleaned on the surface is immersed in a suitable solution, which at the same time contains an oxidizing agent and a barium salt. For example, the solution may contain potassium ferri-cyanide and barium hydroxide in suitable concentration. Upon the immersion of the wire there is formed on the surface thereof a whitish, greatly porous coating, which contains tungsten, barium and oxygen, and in all probability, according to the conditions of reaction, is to be regarded as barium tungstate or tungsten bronze. The reaction may possibly be as follows:

At first the potassium ferri-cyanide is reduced to ferro-cyanide, and the tungsten wire oxidized on the surface to form trioxide of tungsten. This tungsten trioxide then reacts instantaneously with the barium hydroxide to form barium tungstate. The thickness of the layer formed depends on the duration of the reaction and the concentration of the solutions employed, and also on the temperature of the bath. The time during which the cathode wire is treated in the bath may preferably amount to between a few seconds and a few minutes.

The resulting coating may now be immersed once or several times in a solution of, say, barium nitrate for the purpose of filling the existing pores, and then dried. The wire preliminarily treated in this fashion is now heated—if necessary, after assembly in the audion. The barium tungstate is thereby initially converted, with the loss of oxygen, into barium tungsten bronze, which upon continued high heating changes, with the additional discharge of oxygen, into tungsten and barium oxide.

The wire, which is now coated on the surface substantially with a layer of barium oxide, may be activated, preferably by the application of a layer of metallic barium.

It is possible on the other hand to convert the coating of barium tungstate, in a vacuum—for example in the discharge tube itself—into barium oxide wire without a separate heating process by simply applying metallic barium thereto by atomization. The reaction in this case is to be regarded as a reaction between barium tungstate and barium, in which metallic tungstate and barium oxide are formed. The filament is activated by the excess of vaporized barium which is preferably employed, so that no separate forming operation is required.

Instead of employing a reaction bath containing an oxidizing agent, as set forth above, it is also possible to furnish the tungsten wire on the surface with a coating of barium tungstate by an electro-chemical treatment in a bath containing a barium salt. If the tungsten wire is connected up to form an anode, there is formed at first on its surface by anodic oxidation tungsten oxide, which combines immediately with the barium hydroxide, to form barium tungstate.

Furthermore it is also possible to start with a tungsten filament, which has already been furnished with a coating of oxide, and to convert the oxide layer into barium tungstate by treating it with a solution containing barium hydroxide. This modification of the method, however, is particularly difficult to perform, insofar as it is extremely difficult to produce a tungsten filament having an exactly defined oxide coating.

The method is in no way limited to the metals referred to in the above, but nevertheless particularly favourable results are obtained by the use of chromium, molybdenum and tungsten on the one hand, and magnesium, calcium, strontium and barium on the other hand.

With the assistance of the present method it is possible for the first time to produce outside of the tube cathode filaments in simple fashion having an oxide coating of exactly determined thickness and extremely even nature.

Naturally in place of tungsten, chromium or molybdenum wire it is also possible to employ as core wires composed of other suitable highly refractory material having a coating of the said metals.

It has been found to be of advantage to rid the coating consisting of the compound of the body metal, with the alkaline earth metal and oxygen formed in the reaction bath of the excess of the reaction substances by rinsing or relatively long washing. Conveniently the washing process may be combined with the pore-filling operation.

According to the invention, the highly emissive cathodes may be produced in a continuous process. In this case attention should be paid to the fact that the concentration of the bath and the rate of passage are maintained constant.

According to a further feature of the invention a cathode core may be first finally mounted in the electrode system and then treated according to the process described above. Since the grids of valves usually consist of molybdenum, and molybdenum upon being treated according to said process would be coated on the surface with a layer of alkaline earth molybdate, which also possesses extremely high emissive properties, and in consequence might give rise to disturbances in operation by reason of secondary electronic emission, it is necessary to either employ grids which consist of an indifferent material as regards the process, such as nickel, or to furnish the grid with an indifferent coating prior to the treatment of the cathode filament. This may be performed, for example, by furnishing the molybdenum grid with a nickel coating. On the other hand it is also possible to provide the grid material with an indifferent coating, such as paraffine, and to remove this coating, for example by evaporation, after the valve has been completed.

As regards the process according to the invention, it is possible to make use of all of the cathode materials and embodiments of the process as described. It is merely essential as regards this feature of the invention that the process from the pure cathode core up to the finished high emission cathode is performed within the finally mounted system.

The invention may be more fully understood from the accompanying drawing in which.

Figure 1:
Fig. 1 shows a cathode according to the invention.

Referring to the drawing in Fig. 1, I is a cathode wire consisting of a metal of the sixth group preferably tungsten, chromium or molybdenum, which is surrounded of a compound 2 consisting of the body metal, an alkaline earth metal and oxygen. 3 is a further layer which consists of an activating metal being applied to the cathode wire in an adapted manner, e. g. by means of vaporizing.

Figure 2:
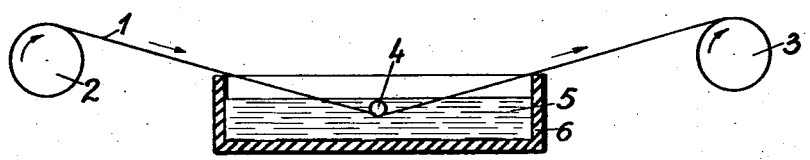
Fig. 2 shows an arrangement according to the invention for treating the cathode wire.

Fig. 2 is relative to the process according to the invention whereat the cathode wire is superficially oxidized and the oxide is made to react with a solution of a compound of an earth alkaline metal, e. g. highly saturated watery or alcoholic solution of barium hydroxide [$Ba(OH)_2$] and a potassium ferri-cyanide [$K_4(FeCN)_6$], unity ratio, the wire being uncoiled from a reel 2 and coiled up on a reel 3 after having passed through the bath 5 in a vessel 6. The small roller 4 serves as guide roller.

Figure 3:
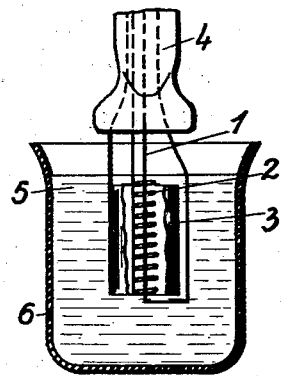
Fig. 3 shows a finally mounted system of an electron valve, whereof the filament is to be treated according to the invention.
Figure 4:
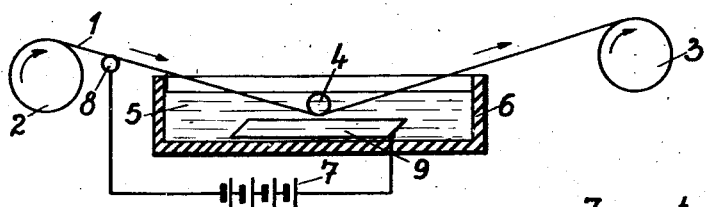
Fig. 4 shows an arrangement for oxidizing the cathode wire by anodic oxidation.

Fig. 3 shows an electrode system with the finally mounted cathode wire 1, the grid 2 and the anode 3, which are mounted on the press 4 of the valve. In this arrangement the cathode wire 1 is treated according to the invention by dipping the fully mounted system into a bath 5, consisting of highly saturated watery or alcoholic solution of barium hydroxide and potassium ferri-cyanide in the vessel 6.

I claim:

1. A method of producing electron valves with high emission cathodes comprising the steps of superficially oxidizing a wire, the surface of which consists of a metal of the sixth group of the periodical system, making said oxide react with the solution of a hydroxide of a metal of the second group, mounting said wire into a vessel, evacuating said vessel and splitting said reaction compound up into the metal of the sixth group and the oxide of the metal of the second group by vaporizing an alkaline earth metal on to said compound and heating it to a high temperature.

2. A method of producing electron valves with high emission cathodes comprising the steps of producing a wire having a core consisting of a metal of the sixth group comprising tungsten, chromium, molybdenum, dipping said wire in a reaction bath consisting of a solution of barium hydroxide and ferri-cyanide of potassium to produce a compound consisting of said metal, a metal of the second group and oxygen, mounting said wire in a bulb, evacuating said bulb and splitting said compound up into the pure metal of the sixth group and the oxide of the metal of the second group.

3. In a method of producing highly emissive cathodes the steps of superficially oxidizing a wire, the surface of which consists of a metal of the sixth group of the periodical system, making said oxide react with the solution of a hydroxide of a metal of the second group to build up a coating comprising a metal of the sixth group, a metal of the second group and oxygen, washing said coating, drying said coating and alternatively dipping said coated wire into a solution containing the nitrate of at least one alkaline earth metal and drying it to fill up the pores of said coating with said earth alkaline nitrate, mounting said coated wire in a vacuum and splitting said coating up into the metal of the sixth group and the oxide of the metal of the second group by vaporizing an alkaine earth metal on to said coating and heating it to a high temperature.

4. A method of producing electron bulbs with high emission cathodes comprising the steps of producing a wire having a core consisting of a metal of the sixth group comprising tungsten, chromium, molybdenum, dipping said wire in a reaction bath consisting of a solution of barium, hydroxide and ferri-cyanide of potassium to produce a compound consisting of said metal, a metal of the second group and oxygen, mounting said wire in a bulb, evacuating said bulb and splitting said compound up into the pure metal of the sixth group and the oxide of the metal of the second group by vaporizing an alkaline earth metal on to said compound and heating it to a high temperature.

5. A method of producing electron valves with highly emissive cathodes comprising the steps of mounting a wire, the surface of which consists of a metal of the sixth group of the periodical system in an electrode system comprising grid and plate superficially oxidizing said wire, dipping the system into a solution of a hydroxide of a metal of the second group to produce on said wire a coating containing said metal of the sixth group, a metal of the second group and oxygen, washing said system, drying said system and sealing it into a vessel, evacuating said vessel and splitting said coating up into the metal of the sixth group and the oxide of the metal of the second group.

6. A method of producing electron valves with highly emissive cathodes comprising the steps of mounting a wire, the surface of which consists of a metal of the sixth group of the periodical system in an electrode system comprising grid and plate, superficially oxidizing said wire, dipping the system into a solution of a hydroxide of a metal of the second group, to produce on said wire a coating containing said metal of the sixth group, a metal of the second group and oxygen, washing said system, drying said system and sealing it into a vessel, evacuating said vessel and splitting said coating up into the metal of the sixth group and the oxide of the metal of the second group by vaporizing an alkaline earth metal on to said compound and heating it to a high temperature.

7. A method of producing electron valves with highly emissive cathodes comprising the steps of mounting a wire, the surface of which consists of a metal of the sixth group of the periodical system in an electrode system comprising grid and plate, dipping said system in a reaction bath and consisting of a solution of barium-hydroxide and ferri-cyanide of potassium to produce on said wire a compound consisting of said metal of the sixth group, a metal of the second group and oxygen, washing said system, drying said system and sealing it into a vessel, evacuating said vessel and splitting said coating up into the metal of the sixth group and the oxide of the metal of the second group.

8. A method of producing electron valves with highly emissive cathodes comprising the steps of mounting a wire, the surface of which consists of a metal of the sixth group of the periodical system in an electrode system comprising grid and plate, dipping said system in a reaction bath consisting of a solution of barium-hydroxide and ferri-cyanide of potassium to produce on said wire a compound consisting of said metal of the sixth group, a metal of the second group and oxygen, washing said system, drying said system and sealing it into a vessel, evacuating said vessel and splitting said coating up into the metal of the sixth group and the oxide of the metal of the second group by vaporizing an alkaline earth metal on to said compound and heating it to a high temperature.

ERNST WALDSCHMIDT.